D. WOLF.
Plow-Point.
No. 203,690. Patented May 14, 1878.
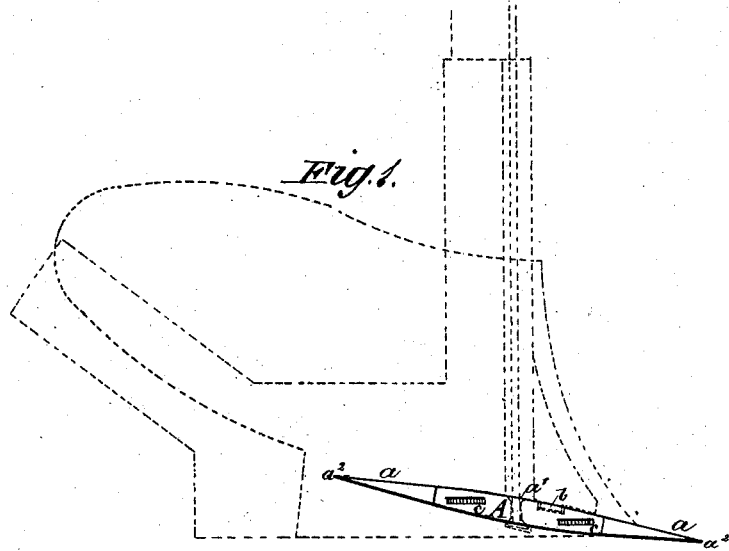
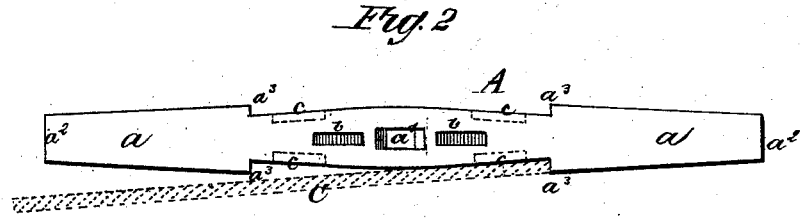
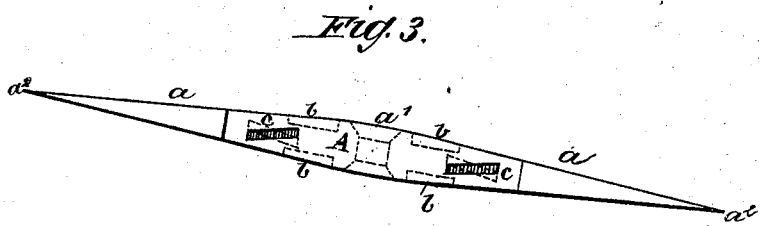
WITNESSES:
INVENTOR:
D. Wolf
BY
ATTORNEYS.

UNITED STATES PATENT OFFICE.

DAVID WOLF, OF AVON, PENNSYLVANIA.

IMPROVEMENT IN PLOW-POINTS.

Specification forming part of Letters Patent No. 203,690, dated May 14, 1878; application filed March 5, 1878.

*To all whom it may concern:*

Be it known that I, DAVID WOLF, of Avon, in the county of Lebanon and State of Pennsylvania, have invented a new and Improved Plow-Point, of which the following is a specification:

My invention has for its object to furnish, and consists in, a reversible and invertible plow-point, constructed as hereinafter described.

In the accompanying drawing, Figure 1 represents a land-side view of a left-hand plow provided with my improved plow-point. Fig. 2 is a plan view of the plow-point. Fig. 3 is a side view of the same.

Similar letters of reference indicate corresponding parts.

A is the reversible and invertible plow-point, being a double-pointed steel-shod iron bar, the two wedge-shaped points $a$ meeting with their bases together at or about the center, where the said bar A has a vertical oblong countersunk perforation, $a^1$, the length of which is in line with the length of the plow-point A.

Looking from above, as in Fig. 2, the two vertical sides of the double-pointed bar A are gradually converging from its central part at the hole $a^1$ toward the flat points $a^2$ at both ends, the width, however, being reduced by rabbeting both sides equally and uniformly from the center a distance toward both ends, for the reception of the cutter and the land-side C, (see Fig. 2,) which are lodged therein line with each other and with the side of the plow-point, the forward edge of the lower end of the cutter fitting tightly against the forward shoulder $a^3$ on that side.

At equal distances in front and rear of the hole $a^1$ the top and bottom of the bar A are provided with oppositely-placed recesses $b$.

Similar recesses $c$ are similarly arranged in the two vertical sides of the bar A, all the recesses $b\ c$ being between the pair of shoulders $a^3$ of one end of tooth $a$ and the similar pair of shoulders $c^3$ of the other end of tooth $a$.

The recesses $c$ are made at such an inclination between their length and that of the plow-point A that when the latter is adjusted to the proper pitch they will be about horizontal.

The plow-point A is secured to the plow by a bolt inserted through the hole $a^1$, as shown in Fig. 1, and running up along and near the front of the standard and through the plow-beam, being tightened and held by a nut or otherwise at its upper end.

The plow-point is held in position laterally by a lug or projection cast on the lower side of the mold-board, and which enters the upper forward recess $b$.

A thin hook adjusted to the inside at the cutter is also entered into the same recess, to keep the cutter from getting out of its position laterally.

By securing the plow-point direct to the beam by the king-bolt there is much less strain on the mold-board and standard, and they can be made weaker.

The rear top recess $b$ will engage with a lug projecting downward from the shank of the plow, and with a hook to keep the plow-point A tight to the inside of the land-side, and thereabout is also an inward projection or support over the top of the plow-point, to resist the strain at the front end of the plow-point when striking rocks or stumps.

The side recesses $c$ are for receiving the front end of the shear, only one slot, $c$, being used at a time.

The under side of the front tooth $a$ is continued in one line by the under side of the cutter and the land-side or heel.

I generally make the points $a$ a little different in shape from each other, one being shorter and stronger for use in rough land and the other longer and lighter for use in clear land.

The pitch or inclination of the point may be varied a little by placing a piece of leather or wood on top of the rear end of the plow-point between the latter and the support, which keeps it down.

I am aware that reversible plow-points are not broadly new; but

What I claim is—

A reversible and invertible plow-point consisting of the double-pointed bar A, tapering from the middle to the two ends, and having opposite rabbets, one on each of its vertical sides, extending uniformly and equally toward both ends from center to shoulders $a^3$, and being provided with upper and lower opposite recesses $b$, the laterally-opposite recesses $c$, and the oppositely-countersunk oblong hole $a^1$, to adapt it for being secured to beam, landside, mold-board, and other parts of plow, as shown and described.

DAVID WOLF.

Witnesses:
   JOHN M. GOOD,
   JOHN H. WALTZ.